United States Patent
Tajima

(10) Patent No.: US 9,617,416 B2
(45) Date of Patent: Apr. 11, 2017

(54) POLYCARBONATE RESIN COMPOSITION AND MOLDED ARTICLE THEREOF

(71) Applicant: MITSUBISHI CHEMICAL CORPORATION, Chiyoda-ku (JP)

(72) Inventor: Hiroyuki Tajima, Hiratsuka (JP)

(73) Assignees: MITSUBISHI CHEMICAL CORPORATION, Chiyoda-ku (JP); MITSUBISHI ENGINEERING-PLASTICS CORPORATION, Chuo-ku (JP)

( * ) Notice: Subject to any disclaimer, the term of this patent is extended or adjusted under 35 U.S.C. 154(b) by 34 days.

(21) Appl. No.: 14/425,979

(22) PCT Filed: Sep. 2, 2013

(86) PCT No.: PCT/JP2013/073492
§ 371 (c)(1),
(2) Date: Mar. 4, 2015

(87) PCT Pub. No.: WO2014/038500
PCT Pub. Date: Mar. 13, 2014

(65) Prior Publication Data
US 2015/0210851 A1    Jul. 30, 2015

(30) Foreign Application Priority Data

Sep. 5, 2012 (JP) .................................. 2012-195049
May 24, 2013 (JP) .................................. 2013-109571

(51) Int. Cl.
| | | |
|---|---|---|
| C08L 69/00 | (2006.01) | |
| B29C 45/00 | (2006.01) | |
| C08J 5/18 | (2006.01) | |
| B29K 69/00 | (2006.01) | |
| B29L 7/00 | (2006.01) | |
| B29L 31/30 | (2006.01) | |

(52) U.S. Cl.
CPC .......... *C08L 69/00* (2013.01); *B29C 45/0001* (2013.01); *C08J 5/18* (2013.01); *B29K 2069/00* (2013.01); *B29K 2995/0088* (2013.01); *B29L 2007/008* (2013.01); *B29L 2031/3005* (2013.01); *C08J 2369/00* (2013.01); *C08J 2433/12* (2013.01); *C08J 2469/00* (2013.01); *C08L 2203/16* (2013.01); *C08L 2205/025* (2013.01); *C08L 2205/03* (2013.01)

(58) Field of Classification Search
None
See application file for complete search history.

(56) References Cited

U.S. PATENT DOCUMENTS

| | | | | |
|---|---|---|---|---|
| 6,011,111 A * | 1/2000 | Brennan | .................. | C08K 7/04 |
| | | | | 524/494 |
| 6,043,334 A * | 3/2000 | Kanamaru | ........... | C08G 64/045 |
| | | | | 430/58.35 |
| 2007/0009741 A1 | 1/2007 | Boven et al. | | |
| 2008/0145632 A1* | 6/2008 | Nagami | .................. | B32B 27/36 |
| | | | | 428/220 |
| 2008/0218666 A1* | 9/2008 | Toyooka | ........... | G02F 1/133528 |
| | | | | 349/96 |
| 2008/0239211 A1* | 10/2008 | Suzuki | ................. | G02B 5/3016 |
| | | | | 349/96 |
| 2009/0142537 A1* | 6/2009 | Hong | ...................... | C08L 33/10 |
| | | | | 428/64.7 |
| 2011/0223414 A1* | 9/2011 | Higuchi | .................. | B32B 27/08 |
| | | | | 428/334 |

(Continued)

FOREIGN PATENT DOCUMENTS

| | | |
|---|---|---|
| JP | 11-060878 A | 3/1999 |
| JP | 11-158364 A | 6/1999 |

(Continued)

OTHER PUBLICATIONS

Extended European Search Report in Corresponding EP Patent Application No. 13834754.7, 5 pp.
International Search Report issued Nov. 19, 2013 in PCT/JP2013/073492 Filed Sep. 2, 2013.

*Primary Examiner* — Tahseen N Khan
(74) *Attorney, Agent, or Firm* — Oblon, McClelland, Maier & Neustadt, L.L.P.

(57) ABSTRACT

The present invention provides a polycarbonate resin composition which exhibits high surface hardness and excellent abrasion resistance and transparency, which does not suffer from whitening during molding, and which exhibits excellent thin wall moldability.
A polycarbonate resin composition containing, relative to 100 parts by mass of (A) a polycarbonate resin containing a polycarbonate resin having a structural unit represented by general formula (1) below,
3-200 parts by mass of (B) a (meth)acrylate copolymer containing (b1) aromatic (meth)acrylate units and (b2) methyl methacrylate units at a (b1)/(b2) mass ratio of 5-80/95-20.

[Chemical Formula 1]

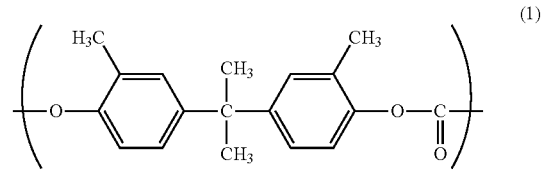

(1)

12 Claims, No Drawings

(56) References Cited

U.S. PATENT DOCUMENTS

2012/0252985 A1* 10/2012 Rosenquist ............. C08L 69/00
    525/439
2013/0059158 A1* 3/2013 Oguro ..................... B32B 27/08
    428/412

FOREIGN PATENT DOCUMENTS

| | | |
|---|---|---|
| JP | 2004-210889 A | 7/2004 |
| JP | 2007-051233 A | 3/2007 |
| JP | 2007-326938 A | 12/2007 |
| JP | 2009-500195 A | 1/2009 |
| JP | 2009-538378 A | 11/2009 |
| JP | 2011-225862 | 3/2011 |
| JP | 2012-036264 A | 2/2012 |

\* cited by examiner

POLYCARBONATE RESIN COMPOSITION AND MOLDED ARTICLE THEREOF

TECHNICAL FIELD

The present invention relates to a polycarbonate resin composition and a molded article thereof, and more specifically relates to a polycarbonate resin composition, which exhibits high surface hardness and excellent abrasion resistance and transparency, which does not suffer from whitening during molding, and which exhibits excellent thin wall moldability, and to a molded article thereof.

BACKGROUND ART

Polycarbonate resins are used as thermoplastic resins having excellent impact resistance, heat resistance and transparency in a wide variety of applications, such as interior panels for vehicles, headlamp lenses for vehicles, and housings for mobile phones, mobile terminals, liquid crystal televisions and personal computers, and are also used as vehicle windows and the like due to exhibiting excellent productivity and being lighter than inorganic glasses.

In addition, sheets and films that use polycarbonate resins are also widely used, additional processing such as laminate formation and hard coat treatment is often carried out using such sheets and films, and such sheets and films are also widely used as a variety of components for a variety of display devices, interior parts for vehicles and components for protective devices.

However, currently used polycarbonate resins derived from 2,2-bis(4-hydroxyphenyl)propane, otherwise known as bisphenol A, exhibit excellent mechanical characteristics, but exhibit low surface hardness, which is represented by pencil hardness (the pencil hardness of polycarbonate resins derived from bisphenol A is 2B).

Many polycarbonate resins and polycarbonate resin compositions have been proposed in the past in order to improve the surface hardness of polycarbonate resins.

For example, Patent Document 1 reports that a high surface hardness corresponding to a pencil hardness of 2H can be achieved by means of a copolycarbonate of dimethylbisphenolcyclohexane and bisphenol A.

Furthermore, a composition obtained by blending a silicone oil in a polycarbonate resin (Patent Document 2), a composition obtained by blending a sliding filler such as a silicone compound (Patent Document 3) and a composition obtained by blending an antiplasticizer such as a biphenyl compound, a terphenyl compound or a polycaprolactone (Patent Document 4) have been reported as resin compositions having high surface hardnesses.

However, these polycarbonate resins certainly exhibit improved surface hardness, but are still unsatisfactory in, for example, outdoor applications where weathering resistance is required or applications where even higher surface hardness and abrasion resistance are required.

In addition, Patent Document 5 discloses an invention of a polycarbonate resin composition which exhibits good light conductivity and which is obtained by blending an acrylic resin having a molecular weight of 200-100,000 in a polycarbonate resin, and proposes using this polycarbonate resin composition in a light guide plate.

However, this type of polycarbonate resin composition exhibits reduced impact resistance, heat resistance and transparency, and readily whitens during molding, and it was found that this whitening becomes remarkably worse during high speed molding carried out at speeds of, for example, 200 mm/sec or higher, or when forming a thin wall molded article, or when forming a molded article having a part shaped in such a way that the shear rate increases during resin filling.

CITATION LIST

Patent Literature

[Patent Document 1] Japanese Translation of PCT Application, Publication No. JP 2009-500195
[Patent Document 2] Japanese Patent Application Publication No. 2004-210889
[Patent Document 3] Japanese Patent Application Publication No. 2007-51233
[Patent Document 4] Japanese Patent Application Publication No. 2007-326938
[Patent Document 5] Japanese Patent Application Publication No. H11-158364

SUMMARY OF INVENTION

Technical Problem

In view of the problems mentioned above, the purpose of the present invention is to provide a polycarbonate resin composition which exhibits high surface hardness and excellent abrasion resistance and transparency, which does not suffer from whitening during molding, and which exhibits excellent thin wall moldability.

Solution to Problem

As a result of diligent research into how to solve the problems mentioned above, the inventors of the present invention found that a polycarbonate resin composition obtained by incorporating a specific quantity of a specific (meth)acrylic copolymer in an aromatic polycarbonate resin having specific repeating units as a polycarbonate resin exhibited a high surface hardness, excellent abrasion resistance and transparency, did not suffer from whitening during molding and exhibited excellent thin wall moldability, and thereby completed the present invention.

The present invention provides the following polycarbonate resin composition, and a molded article thereof.

[1] A polycarbonate resin composition containing, relative to 100 parts by mass of (A) a polycarbonate resin containing a polycarbonate resin having a structural unit represented by general formula (1) below, 3-200 parts by mass of (B) a (meth)acrylate copolymer containing (b1) aromatic (meth)acrylate units and (b2) methyl methacrylate units at a (b1)/(b2) mass ratio of 5-80/95-20.

[Chemical Formula 1]

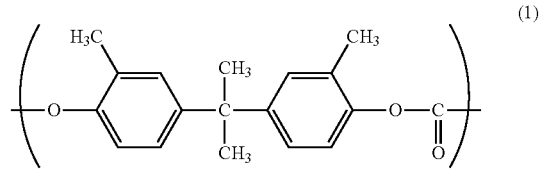

[2] The polycarbonate resin composition according to [1] above, wherein the mass average molecular weight of the (meth)acrylate copolymer (B) is 5,000-30,000.

[3] The polycarbonate resin composition according to [1] or [2] above, wherein the content of the (meth)acrylate copolymer (B) is 15-45 parts by mass relative to 100 parts by mass of the polycarbonate resin (A).

[4] The polycarbonate resin composition according to any one of [1] to [3] above, wherein the proportion of the polycarbonate resin having a structural unit represented by general formula (1) is 80 mass % or more of the polycarbonate resin (A).

[5] The polycarbonate resin composition according to any one of [1] to [4], wherein the polycarbonate resin (A) contains 60-90 mass % of the polycarbonate resin having a structural unit represented by general formula (1) and 40-10 mass % of a polycarbonate resin having a structural unit represented by general formula (2) below:

[Chemical Formula 2]

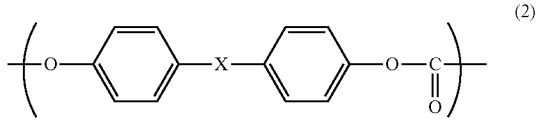

(in general formula (2), X denotes any of

[Chemical Formula 3]

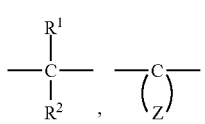

$R^1$ and $R^2$ each independently denote a hydrogen atom or a methyl group, and Z denotes a group that bonds to a carbon atom (C) to form an optionally substituted alicyclic hydrocarbon having 6-12 carbon atoms).

[6] The polycarbonate resin composition according to [5] above, wherein X in general formula (2) is an isopropylidene group.

[7] The polycarbonate resin composition according to [5] or [6] above, wherein the viscosity average molecular weight of the polycarbonate resin having a structural unit represented by general formula (1) is 15,000-35,000, and the viscosity average molecular weight of the polycarbonate resin having a structural unit represented by general formula (2) is 10,000-28,000.

[8] A molded article obtained by injection molding the polycarbonate resin composition according to any one of [1] to [7] above.

[9] The molded article according to [8], which is injection molded at a cylinder temperature of 260-340° C. and an injection speed of 100-5,000 mm/sec.

[10] The molded article according to [8] or [9] above, which has a thickness of 2 mm or less.

[11] The molded article according to any one of [8] to [10], wherein the molded article is any one of an interior panel for a vehicle, a lamp lens for a vehicle, a window, a housing, a game machine component, a touch panel and a light guide.

[12] A sheet or film obtained by extrusion molding the polycarbonate resin composition according to any one of [1] to [7].

[13] A protective window for a portable display unit, a component for a display device, a cover for a display device, a component for a protective device, or a vehicle part, each using the sheet or film according to [12] above.

Advantageous Effects of Invention

According to the polycarbonate resin composition of the present invention, it is possible to provide a polycarbonate resin composition which exhibits high surface hardness and excellent abrasion resistance and transparency without losing the excellent mechanical characteristics of a polycarbonate resin composition, which does not suffer from whitening during molding and which exhibits excellent thin wall moldability.

DESCRIPTION OF EMBODIMENTS

The present invention will now be explained in detail through the use of embodiments, examples etc.

Moreover, in the description of the present application, the symbol "-" means that the upper and lower limits of the numerical values mentioned before and after the symbol are included, unless otherwise specified.

SUMMARY

The polycarbonate resin composition of the present invention contains, relative to 100 parts by mass of (A) a polycarbonate resin containing a polycarbonate resin having a structural unit represented by general formula (1) above, 3-200 parts by mass of (B) a (meth)acrylate copolymer containing (b1) aromatic (meth)acrylate units and (b2) methyl methacrylate units at a (b1)/(b2) mass ratio of 5-80/95-20.

Detailed explanations will now be given of the components used in the polycarbonate resin composition of the present invention and of a method for producing the molded article of the present invention.

[Polycarbonate Resin (A)]

The polycarbonate resin (A) used in the polycarbonate resin composition of the present invention is a polycarbonate resin (A) containing a polycarbonate resin having a structural unit represented by general formula (1) below.

[Chemical Formula 4]

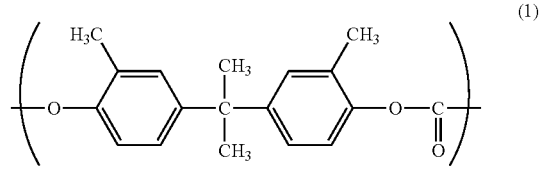

The polycarbonate resin having a structural unit represented by general formula (1) above can be produced by using 2,2-bis(3-methyl-4-hydroxyphenyl)propane as a dihydroxy compound.

The polycarbonate resin (A) can have carbonate structural units other than the structural unit represented by general formula (1), for example a structural unit represented by general formula (2) (for example, a structural unit derived from bisphenol A) or a structural unit derived from other dihydroxy compounds such as those mentioned later. The copolymerization quantity of structural units other than the structural unit represented by general formula (1) is generally 60 mol. % or lower, preferably 50 mol. % or lower, more preferably 40 mol. % or lower, further preferably 30 mol. % or lower, and particularly preferably 20 mol. % or lower.

It is preferable for the viscosity average molecular weight (Mv) of the polycarbonate resin (A) to be 15,000-35,000. If the viscosity average molecular weight falls within this numerical range, moldability is good and a molded article having good mechanical strength can be easily obtained, but the surface impact resistance deteriorates and practical problems can occur if the viscosity average molecular weight is lower than 15,000, and the melt viscosity increases and it tends to be difficult to carry out injection molding or extrusion molding if the viscosity average molecular weight exceeds 35,000. The lower limit for the molecular weight of the polycarbonate resin (A) is preferably 20,000, more preferably 21,000, and further preferably 22,000, and the upper limit for the molecular weight is preferably 33,000, more preferably 32,000, and further preferably 30,000.

Here, the viscosity average molecular weight (Mv) means the value obtained by determining the intrinsic viscosity ($\eta$, units: dl/g) at 20° C. using an Ubbelohde viscometer and using dichloromethane as a solvent, and calculating from the Schnell viscosity equation: $[\eta]=1.23\times10^{-4} Mv^{0.83}$.

The polycarbonate resin (A) may be a single type or a mixture of two or more types thereof, and the viscosity average molecular weight may be adjusted by mixing two or more types of polycarbonate resin having different viscosity average molecular weights.

In addition to the polycarbonate resin having a structural unit represented by general formula (1) above, the polycarbonate resin (A) used in the polycarbonate resin composition of the present invention preferably contains a polycarbonate resin having a structural unit represented by general formula (2) below:

[Chemical Formula 5]

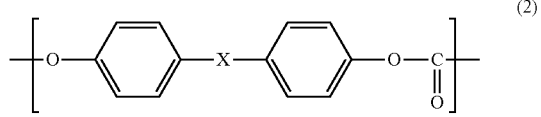

(2)

(in general formula (2), X denotes any of

[Chemical Formula 6]

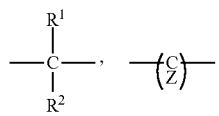

$R^1$ and $R^2$ each independently denote a hydrogen atom or a methyl group, and Z denotes a group that bonds to a carbon atom (C) to form an optionally substituted alicyclic hydrocarbon having 6-12 carbon atoms).

A preferred specific example of a polycarbonate structural unit represented by general formula (2) above is a carbonate structural unit derived from 2,2-bis(4-hydroxyphenyl)propane, otherwise known as bisphenol A.

The polycarbonate resin having a structural unit represented by general formula (2) may have carbonate structural units other than a structural unit represented by general formula (2), and may have a carbonate structural units derived from other dihydroxy compounds. In general, the copolymerization quantity of structural units other than the structural unit represented by general formula (2) is preferably less than 50 mol. %, more preferably 40 mol. % or lower, further preferably 30 mol. % or lower, particularly preferably 20 mol. % or lower, and most preferably 10 mol. % or lower or 5 mol. % or lower.

Examples of other dihydroxy compounds include aromatic dihydroxy compounds such as those listed below.

Bis(4-hydroxyphenyl)methane, 2,2-bis(4-hydroxyphenyl)butane, 2,2-bis(4-hydroxyphenyl)pentane, 2,2-bis(4-hydroxyphenyl)-4-methylpentane, 2,2-bis(3-methyl-4-hydroxyphenyl)propane, 2,2-bis(3,5-dimethyl-4-hydroxyphenyl)propane, 2,2-bis(3-(1-methylethyl)-4-hydroxyphenyl)propane, 2,2-bis(3-tert-butyl-4-hydroxyphenyl)propane, 2,2-bis(3-(1-methylpropyl)-4-hydroxyphenyl)propane, 2,2-bis(3-cyclohexyl-4-hydroxyphenyl)propane, 2,2-bis(3-phenyl-4-hydroxyphenyl)propane, 1,1-bis(4-hydroxyphenyl)decane, 1,1-bis(4-hydroxyphenyl)cyclohexane, 1,1-bis(4-hydroxyphenyl)-1-phenylethane, bis(4-hydroxyphenyl)phenylmethane, 1,1-bis(3-methyl-4-hydroxyphenyl)cyclohexane, 1,1-bis(3,5-dimethyl-4-hydroxyphenyl)cyclohexane, 1,1-bis(3-(1-methylethyl)-4-hydroxyphenyl)cyclohexane, 1,1-bis(3-tert-butyl-4-hydroxyphenyl)cyclohexane, 1,1-bis(3-(1-methylpropyl)-4-hydroxyphenyl)cyclohexane, 1,1-bis(3-cyclohexyl-4-hydroxyphenyl)cyclohexane, 1,1-bis(4-hydroxy-3-phenylphenyl)cyclohexane, 1,1-bis(3-methyl-4-hydroxyphenyl)-1-phenylethane, 1,1-bis(3,5-dimethyl-4-hydroxyphenyl)-1-phenylethane, 1,1-bis(3-(1-methylethyl)-4-hydroxyphenyl)-1-phenylethane, 1,1-bis(3-tert-butyl-4-hydroxyphenyl)-1-phenylethane, 1,1-bis(3-(1-methylpropyl)-4-hydroxyphenyl)-1-phenylethane, 1,1-bis(3-cyclohexyl-4-hydroxyphenyl)-1-phenylethane, 1,1-bis(3-phenyl-4-hydroxyphenyl)-1-phenylethane, 1,1-bis(4-hydroxyphenyl)cyclopentane, 1,1-bis(4-hydroxyphenyl)cyclooctane, 4,4'-(1,3-phenylenediisopropylidene)bisphenol, 4,4'-(1,4-phenylenediisopropylidene)bisphenol, 9,9-bis(4-hydroxyphenyl)fluorene, 9,9-bis(3-methyl-4-hydroxyphenyl)fluorene, 4,4'-dihydroxybenzophenone, 4,4'-dihydroxyphenyl ether, 4,4'-dihydroxybiphenyl, 1,1-bis(4-hydroxyphenyl)-3,3-5-trimethylcyclohexane, 1,1-bis(3-tert-butyl-6-methyl-4-hydroxyphenyl)butane, and the like.

The viscosity average molecular weight (Mv) of the polycarbonate resin having a structural unit represented by general formula (2) is preferably 10,000-28,000. If the viscosity average molecular weight falls within this numerical range, moldability is good and a molded article having good mechanical strength can be easily obtained, but the surface impact resistance deteriorates and the resin can be difficult to use if the viscosity average molecular weight is lower than 10,000, and the melt viscosity increases and it tends to be difficult to carry out injection molding or extrusion molding if the viscosity average molecular weight exceeds 28,000. The lower limit for the molecular weight of the polycarbonate resin having a structural unit represented by general formula (2) is preferably 16,000, more preferably 17,000, and further preferably 18,000, and the upper limit for the molecular weight is preferably 27,000, and more preferably 25,000.

Moreover, the definition of the viscosity average molecular weight (Mv) is as mentioned above.

The polycarbonate resin having a structural unit represented by general formula (2) may be a single type or a mixture of two or more types thereof, and the viscosity average molecular weight may be adjusted by mixing two or more types of polycarbonate resin having different viscosity average molecular weights.

<Method for Producing Polycarbonate Resin>

The methods for producing the polycarbonate resin having a structural unit represented by general formula (1) and the polycarbonate resin having a structural unit represented by general formula (2), which are used in the present invention, are not particularly limited, and any methods may be used. Examples thereof include interfacial polymerization methods, melt transesterification methods, the pyridine process, ring opening polymerization of cyclic carbonate compounds, and solid phase transesterification of prepolymers.

A detailed explanation will now be given of the most suitable of these methods.

Interfacial Polymerization

First, an explanation will be given of a case in which the polycarbonate resin is produced using an interfacial polymerization method.

In the interfacial polymerization method, a polycarbonate resin is obtained by reacting a dihydroxy compound such as those mentioned above with a carbonate precursor (preferably phosgene) in the presence of an organic solvent that is inert in the reaction and an aqueous alkaline solution while maintaining a pH of 9 or higher, and then carrying out interfacial polymerization in the presence of a polymerization catalyst. Moreover, a molecular weight-adjusting agent (a chain terminator) may, if necessary, be present in the reaction system, and an antioxidant may be present in the reaction system in order to prevent oxidation of the dihydroxy compound.

Examples of organic solvents that are inert in the reaction include chlorinated hydrocarbons such as dichloromethane, 1,2-dichloroethane, chloroform, monochlorobenzene and dichlorobenzene; and aromatic hydrocarbons such as benzene, toluene and xylene. Moreover, the organic solvent may be a single type or a combination of two or more arbitrary types thereof combined at arbitrary proportions.

Examples of alkaline compounds contained in the aqueous alkaline solution include alkali metal compounds or alkaline earth metal compounds such as sodium hydroxide, potassium hydroxide, lithium hydroxide and sodium hydrogen carbonate, but of these, sodium hydroxide and potassium hydroxide are preferred. Moreover, the alkaline compound may be a single type or a combination of two or more arbitrary types thereof combined at arbitrary proportions.

The concentration of the alkaline compound in the aqueous alkaline solution is not limited, but in general, a concentration of 5-10 mass % is preferred in order to control the pH of the aqueous alkaline solution within the range 10-12 during the reaction. In addition, in cases where phosgene is blown into the reaction system, it is generally preferable for the molar ratio of the bisphenol compound and the alkaline compound to be 1:1.9 or higher, and especially 1:2.0, and 1:3.2 or lower, and especially 1:2.5 or lower in order to control the pH of the aqueous phase within the range 10-12, and preferably within the range 10-11.

Examples of the polymerization catalyst include aliphatic tertiary amines such as trimethylamine, triethylamine, tributylamine, tripropylamine and trihexylamine; alicyclic tertiary amines such as N,N'-dimethylcyclohexylamine and N,N'-diethylcyclohexylamine; aromatic tertiary amines such as N,N'-dimethylaniline and N,N'-diethylaniline; quaternary ammonium salts such as trimethylbenzyl ammonium chloride, tetramethyl ammonium chloride and triethylbenzyl ammonium chloride; pyridine; guanidine salts, and the like. Moreover, the polymerization catalyst may be a single type or a combination of two or more arbitrary types thereof combined at arbitrary proportions.

Examples of molecular weight-adjusting agents include aromatic phenol compounds having monohydric phenolic hydroxyl groups; aliphatic alcohols such as methanol and butanol; mercaptans; phthalimide, and the like, but of these, aromatic phenol compounds are preferred.

Specific examples of such aromatic phenol compounds include phenol, alkyl group-substituted phenol compounds such as m-methylphenol, p-methylphenol, m-propylphenol, p-propylphenol, p-tert-butylphenol and p-long chain alkyl-substituted phenol compounds; vinyl group-containing phenol compounds such as isopropanylphenol; epoxy group-containing phenol compounds; and carboxyl group-containing phenol compounds such as o-oxybenzoic acid and 2-methyl-6-hydroxyphenyl acetic acid. Moreover, the molecular weight-adjusting agent may be a single type or a combination of two or more arbitrary types thereof combined at arbitrary proportions.

The usage quantity of the molecular weight-adjusting agent is generally 0.5 moles or higher, and preferably 1 mole or higher, and generally 50 moles or lower, and preferably 30 moles or lower, relative to 100 moles of the dihydroxy compound. By setting the usage quantity of the molecular weight-adjusting agent to fall within this range, it is possible to improve the thermal stability and resistance to hydrolysis of the polycarbonate resin composition.

When carrying out the reaction, the order in which the reactants, reaction medium, antioxidant, catalyst, molecular weight-adjusting agent, additives, and the like are blended is not limited as long as the desired polycarbonate resin can be obtained, and an appropriate order should be set arbitrarily. For example, in cases where phosgene is used as a carbonate precursor, the molecular weight-adjusting agent can be blended at any point between the reaction between the dihydroxy compound and the phosgene (a phosgenation reaction) and the start of the polymerization reaction.

Moreover, the reaction temperature is generally 0-40° C., and the reaction time is generally between several minutes (for example, 10 minutes) and several hours (for example, 6 hours).

Melt Transesterification Method

An explanation will now be given of a case in which the polycarbonate resin is produced using a melt transesterification method.

In the melt transesterification method, a transesterification reaction is carried out between, for example, a carbonic acid diester and a dihydroxy compound. The use of phosgene, which is harmful to humans, or solvents such as dichloromethane, which place a heavy burden on the environment, is not required, unlike interfacial polymerization methods, and it is preferable to use a melt transesterification method from the perspective of bringing about little contamination of the polymer by polymerization by-products.

The dihydroxy compound should be the same as those mentioned above.

Meanwhile, examples of carbonic acid diesters include di-alkyl carbonate compounds such as dimethyl carbonate, diethyl carbonate and di-tert-butyl carbonate; diphenyl carbonate; substituted diphenyl carbonates such as ditolyl carbonate, and the like. Of these, diphenyl carbonate and substituted diphenyl carbonates are preferred, and diphenyl carbonate is particularly preferred. Moreover, the carbonic acid diester may be a single type or a combination of two or more arbitrary types thereof combined at arbitrary proportions.

The proportions of the dihydroxy compound and the carbonic acid diester are not limited as long as the desired polycarbonate resin can be obtained, but it is preferable to use the carbonic acid diester at an equimolar quantity or higher relative to 1 mole of the dihydroxy compound, and especially at a quantity of 1.01 moles or more relative to 1 mole of the dihydroxy compound. Moreover, the upper limit of this proportion is generally 1.30 moles or lower. By setting these proportions to fall within this range, the quantity of terminal hydroxyl groups can be adjusted within an appropriate range.

In polycarbonate resins, the quantity of terminal hydroxyl groups tends to have a major effect on thermal stability, resistance to hydrolysis, hue, and the like. Therefore, the quantity of terminal hydroxyl groups may be adjusted if necessary using any publicly known method. In transesterification reactions, it is generally possible to obtain a polycarbonate resin having the desired quantity of terminal hydroxyl groups by, for example, adjusting the blending proportions of the carbonic acid diester and the dihydroxy compound or by adjusting the degree of pressure reduction during the transesterification reaction. Moreover, by carrying out such operations, it is generally possible to adjust the molecular weight of the obtained polycarbonate resin.

In cases where the quantity of terminal hydroxide groups is adjusted by adjusting the blending proportions of the carbonic acid diester and the dihydroxy compound, the blending proportions should be as mentioned above.

In addition, an example of a more proactive adjustment method is a method in which a chain terminator is separately blended during the reaction. In such cases, examples of chain terminators able to be used include monohydric phenol compounds, monohydric carboxylic acids and carbonic acid diesters. Moreover, the chain terminator may be a single type or a combination of two or more arbitrary types thereof combined at arbitrary proportions.

When producing a polycarbonate resin by a melt transesterification method, a transesterification catalyst is generally used. Any transesterification catalyst can be used. Of these, the use of an alkali metal compound and/or an alkaline earth metal compound is preferred. In addition, it is possible to supplementally use a basic compound such as a basic boron compound, a basic phosphorus compound, a basic ammonium compound or an amine-based compound. Moreover, the transesterification catalyst may be a single type or a combination of two or more arbitrary types thereof combined at arbitrary proportions.

In melt transesterification methods, the reaction temperature is generally 100-320° C. In addition, the pressure during the reaction is generally a reduced pressure of 2 mm Hg or lower. A specific procedure is to carry out a melt polycondensation reaction under the temperature and pressure ranges mentioned above while removing by-products such as hydroxy compounds.

The melt polycondensation reaction can be carried out using a batch type method or a continuous method. When carrying out a batch type reaction, the order in which the reactants, reaction medium, catalyst, additives, and the like are blended is not limited as long as the desired polycarbonate resin can be obtained, and an appropriate order should be set arbitrarily. However, from perspectives such as stability of the polycarbonate resin and polycarbonate resin composition, it is preferable for the melt polycondensation reaction to be carried out using a continuous process.

In the melt transesterification method, a catalyst deactivator may be used if necessary. Any compound that neutralizes the transesterification catalyst can be used as a catalyst deactivator. Examples thereof include sulfur-containing acidic compounds and derivatives thereof. Moreover, the catalyst deactivator may be a single type or a combination of two or more arbitrary types thereof combined at arbitrary proportions.

The usage quantity of the catalyst deactivator is generally 0.5 equivalents or higher, and preferably 1 equivalent or higher, and generally 10 equivalents or lower, and preferably 5 equivalents or lower, relative to the alkali metal or alkaline earth metal contained in the transesterification catalyst. Furthermore, the usage quantity of the catalyst deactivator is generally 1 ppm by mass or higher and generally 100 ppm by mass or lower, and preferably 20 ppm by mass or lower, relative to the polycarbonate resin.

<Constituent Proportions of Polycarbonate Resin (A)>

In the polycarbonate resin (A) used in the present invention, structural units represented by general formula (1) above are contained at a proportion of preferably 20 mass % or higher, more preferably 40 mass % or higher, further preferably 60 mass % or higher, and particularly preferably 80 mass % or higher.

As mentioned above, it is preferable for the polycarbonate resin (A) used in the present invention to be a mixture of a polycarbonate resin having a structural unit represented by general formula (1) and a polycarbonate resin having a structural unit represented by general formula (2). In the case of a mixture, it is preferable for the mixing proportions to be 20-95 mass % of a polycarbonate resin having a structural unit represented by general formula (1) and 80-5 mass % of a polycarbonate resin having a structural unit represented by general formula (2), relative to 100 mass % of both polycarbonate resins. By using these polycarbonate resins at mixing proportions such as these and also incorporating the specified quantity of the (meth)acrylate copolymer (B), it is possible to achieve a higher surface hardness and a high degree of abrasion resistance and transparency.

If the proportion by mass of the polycarbonate resin having a structural unit represented by general formula (1) is lower than 20 mass %, the surface hardness of a molded article decreases, the surface is readily scratched when an actual product is formed, whitening readily occurs during molding, and moldability can deteriorate. In addition, if this proportion by mass exceeds 95 mass %, the impact resistance of a molded article deteriorates, cracking readily occurs when an actual product is formed, and transparency can deteriorate.

More preferred mixing proportions are 40-92 mass % of the polycarbonate resin having a structural unit represented by general formula (1) and 60-8 mass % of the polycarbonate resin having a structural unit represented by general formula (2), further preferred mixing proportions are 60-90 mass % of the former and 40-10 mass % of the latter, and particularly preferred mixing proportions are 80-88 mass % of the former and 20-12 mass % of the latter.

In addition, it is preferable for the content of a flaky powder to be 5 mass % or higher relative to a total of 100 mass % of the polycarbonate resins in the present invention. The content of the flaky powder is more preferably 10 mass % or higher, and further preferably 15 mass % or higher. By incorporating a flaky powder at such a proportion, in cases where additives are blended according to need, it is possible to omit grading of additive components when producing the polycarbonate resin composition, the generation of unmelted materials and aggregation of additives can be suppressed, and an excellent molded article can easily be obtained. The average particle diameter of the flaky powder is preferably 2 mm or less, and more preferably 1.5 mm or less.

It is preferable for the polycarbonate resin, other than the flaky powder, to be in the form of pellets. The length of the pellets is preferably 1-5 mm, and more preferably 2-4 mm, in cases where the cross section of the pellets is elliptical, it is preferable for the long diameter to be 2-3.5 mm and for the short diameter to be 1-2.5 mm, and in cases where the cross section of the pellets is circular, it is preferable for the diameter to be 2-3 mm. The length and cross sectional shape of the pellets can be adjusted by adjusting the speed of rotation of the strand cutter blade, the winding speed, or the quantity discharged from the extruder when producing the polycarbonate resin.

The polycarbonate resin (A) may be a single polycarbonate resin (a single polycarbonate resin is not limited to modes which contain only one type of polycarbonate resin, and can include, for example, modes that contain a plurality of polycarbonate resins having different monomer compositions or molecular weights), but may also be an alloy (mixture) of a polycarbonate resin and another thermoplastic resin. Furthermore, the polycarbonate resin may be constituted as the main component in a copolymer, for example, the polycarbonate resin may be constituted as a copolymer with an oligomer or polymer having a siloxane structure in order to, for example, further increase flame retardancy and impact resistance; the polycarbonate resin may be constituted as a copolymer with a monomer, oligomer or polymer having a phosphorus atom in order to further improve thermal oxidation stability and flame retardancy; the polycarbonate resin may be constituted as a copolymer with a monomer, oligomer or polymer having a dihydroxyanthraquinone structure in order to improve thermal oxidation stability; the polycarbonate resin may be constituted as a copolymer with an oligomer or polymer having an olefin-based structure, such as polystyrene, in order to improve optical properties; and the polycarbonate resin may be constituted as a copolymer with a polyester resin oligomer or polymer in order to improve chemical resistance.

In addition, in order to improve the appearance of a molded article or improve the fluidity, the polycarbonate resin (A) may contain a polycarbonate oligomer. The viscosity average molecular weight (Mv) of this polycarbonate oligomer is generally 1,500 or higher, and preferably 1,800 or higher, and generally 9,500 or lower, and preferably 9,000 or lower. Furthermore, it is preferable for the contained polycarbonate oligomer to account for 30 mass % or less of the polycarbonate resin (A) (including the polycarbonate oligomer).

Furthermore, the polycarbonate resin (A) may use not only virgin raw materials, but also polycarbonate resins regenerated from used products (so-called material-recycled polycarbonate resins). Examples of used products include optical recording media such as optical discs; light guide plates; vehicle windows; vehicle headlamp lenses; transparent vehicle components such as windscreens; containers such as water bottles; eyeglass lenses; and construction components such as sound-proof walls, glass windows and corrugated sheets. In addition, it is possible to use pulverized materials obtained from defective products, sprues and runners, and pellets obtained by melting these.

However, it is preferable for regenerated polycarbonate resins to account for 80 mass % or less, and more preferably 50 mass % or less, of the polycarbonate resin (A) of the present invention. Because regenerated polycarbonate resins are highly likely to have undergone deterioration such as thermal deterioration or age-related deterioration, in cases where such polycarbonate resins are used at quantities in excess of the range mentioned above, it is possible that the hue or mechanical properties will deteriorate.

[(Meth)Acrylate Copolymer (B)]

The polycarbonate resin composition of the present invention contains (B) a (meth)acrylate copolymer, which contains (b1) aromatic (meth)acrylate units and (b2) methyl methacrylate units at a (b1)/(b2) mass ratio of 5-80/95-20.

In the present invention, (meth)acrylate means acrylate or methacrylate.

The aromatic (meth)acrylate that constitutes the aromatic (meth)acrylate unit (b1) is a (meth)acrylate having an aromatic group in the ester moiety. The aromatic (meth)acrylate can be, for example, phenyl (meth)acrylate or benzyl (meth) acrylate. The aromatic (meth)acrylate can be a single type or a combination of two or more types thereof. Of these, phenyl methacrylate and benzyl methacrylate are preferred, and phenyl methacrylate is more preferred. By incorporating the aromatic (meth)acrylate units (b1), it is possible to improve the transparency of a molded article consisting of a mixture of the aromatic (meth)) acrylate units (b1) and the polycarbonate resin (A).

The monomer that constitutes the methyl methacrylate units (b2) is methyl methacrylate. The methyl methacrylate units (b2) have the effect of achieving good dispersion with the polycarbonate resin (A) and can improve the surface hardness of a molded article by migrating to the surface of the molded article.

The (meth)acrylate copolymer contains (b1) aromatic (meth)acrylate units and (b2) methyl methacrylate units at a (b1)/(b2) mass ratio of 5-80/95-20, but if the content ratio of the aromatic (meth)acrylate units (b1) in the (meth)acrylate copolymer (B) is 5 or higher, transparency is maintained if a large quantity of the (meth)acrylate copolymer (B) is added, and if the content ratio of the aromatic (meth)acrylate units (b1) in the (meth)acrylate copolymer (B) is 80 or lower, compatibility with the polycarbonate resin (A) does not become excessively high and migration to the surface of a molded article does not decrease, meaning that the surface hardness of the molded article does not decrease.

In addition, because transparency can be maintained and high surface hardness can be achieved if a large quantity of the (meth)acrylate copolymer (B) is added, it is preferable for the (meth)acrylate copolymer (B) to contain (b1) aromatic (meth)acrylate units and (b2) methyl methacrylate units at a (b1)/(b2) mass ratio of 20-70/80-30.

If the content ratio of the methyl methacrylate units (b2) in the (meth)acrylate copolymer (B) is 20 or higher, compatibility with the polycarbonate resin (A) does not become excessively high and migration to the surface of a molded article does not decrease, meaning that the surface hardness of the molded article does not decrease, and if the content ratio of the methyl methacrylate units (b2) in the (meth) acrylate copolymer (B) is 95 or lower, transparency is maintained if a large quantity of the (meth)acrylate copolymer (B) is added.

The method for polymerizing the monomers used to obtain the (meth)acrylate copolymer (B) can be a publicly known method, such as emulsion polymerization, suspension polymerization, solution polymerization or bulk polymerization. Suspension polymerization and bulk polymerization are preferred, and suspension polymerization is more preferred. In addition, additives required for the polymerization can be added as appropriate according to need, and examples of such additives include polymerization initiators, emulsifying agents, dispersing agents and chain transfer agents.

The mass average molecular weight of the (meth)acrylate copolymer (B) is preferably 5,000-30,000, more preferably 10,000 or higher and further preferably 13,000 or higher, and is more preferably 25,000 or lower and further preferably 20,000 or lower. If the mass average molecular weight is 5,000-30,000, compatibility with the polycarbonate resin (A) tends to be good and the surface hardness improvement effect tends to be excellent.

Moreover, the mass average molecular weight of the (meth)acrylate copolymer (B) can be measured by means of gel permeation chromatography using chloroform or tetrahydrofuran (THF) as a solvent. Moreover, the molecular weight is polystyrene (PS) conversion mass-average molecular weight.

The content of the (meth)acrylate copolymer (B) is 3-200 parts by mass relative to 100 parts by mass of the polycarbonate resin (A). The content of the (meth)acrylate copolymer (B) is preferably 5 parts by mass or higher, more preferably 10 parts by mass or higher, further preferably 15 parts by mass or higher and particularly preferably 20 parts by mass or higher, and is preferably 100 parts by mass or lower, more preferably 75 parts by mass or lower, further preferably 55 parts by mass or lower and particularly preferably 45 parts by mass or lower.

By setting the content of the (meth)acrylate copolymer (B) to fall within such a range, the polycarbonate resin composition of the present invention maintains good transparency and enables a balance of physical properties such as impact resistance while effectively improving the surface hardness and fluidity and suppressing the problem of whitening during molding.

[Other Components]

The polycarbonate resin composition of the present invention may, if necessary, contain components other than those mentioned above as long as the desired physical properties are not significantly impaired. Examples of such other components include resins other than polycarbonate resins and a variety of resin additives. Moreover, it is possible to incorporate a single additional component or a combination of two or more arbitrary types thereof combined at arbitrary proportions.

Other Resins

Examples of other resins include thermoplastic polyester resins such as polyethyleneterephthalate resins, polytrimethyleneterephthalate resins and polybutyleneterephthalate resins; styrene-based resins such as polystyrene resins, high impact polystyrene resins (HIPS), acrylonitrile-styrene copolymers (AS resins), acrylonitrile-styrene-acrylic rubber copolymers (ASA resins), acrylonitrile-ethylene/propylene-based rubber-styrene copolymers (AES resins) and acrylonitrile-butadiene-styrene copolymers (ABS resins); polyolefin resins such as polyethylene resins and polypropylene resins; polyamide resins; polyimide resins; polyether-imide resins; polyurethane resins; polyphenylene ether resins; polyphenylene sulfide resins; and polysulfone resins.

Moreover, it is possible to incorporate a single additional resin or a combination of two or more arbitrary types thereof combined at arbitrary proportions.

In cases where other resins are incorporated, the content of the other resins is preferably 40 mass % or lower, more preferably 30 mass % or lower, and further preferably 20 mass % or lower, relative to a total of 100 mass % of the polycarbonate resin (A), the (meth)acrylate copolymer (B) and the other resins. If the content of the other resins exceeds the range mentioned above, the surface hardness, abrasion resistance and transparency of the polycarbonate resin composition may deteriorate.

Resin Additives

Examples of resin additives include thermal stabilizers, antioxidants, mold release agents, ultraviolet absorbers, flame retardants, dyes/pigments, anti-static agents, anti-fogging agents, lubricants, anti-blocking agents, fluidity-improving agents, plasticizers, dispersing agents and anti-microbial agents. Moreover, it is possible to incorporate a single resin additive or a combination of two or more arbitrary types thereof combined at arbitrary proportions.

Explanations will now be given of specific examples of additives suitable for use in the polycarbonate resin composition of the present invention.

Thermal Stabilizers

Examples of thermal stabilizers include phosphorus-based compounds. It is possible to use any publicly known phosphorus-based compound. Specific examples thereof include oxoacids of phosphorus, such as phosphoric acid, phosphonic acid, phosphorous acid, phosphinic acid and polyphosphoric acid; acidic metal pyrophosphate salts, such as acidic sodium pyrophosphate, acidic potassium pyrophosphate and acidic calcium pyrophosphate; phosphate salts of group 1 or group 2B metals, such as potassium phosphate, sodium phosphate, cesium phosphate and zinc phosphate; organic phosphate compounds, organic phosphite compounds and organic phosphonite compounds, but organic phosphite compounds are particularly preferred.

Examples of organic phosphite compounds include triphenyl phosphite, tris(monononylphenyl)phosphite, tris(monononyl/dinonyl-phenyl)phosphite, tris(2,4-di-tert-butylphenyl)phosphite, monooctyl diphenyl phosphite, dioctyl monophenyl phosphite, monodecyl diphenyl phosphite, didecyl monophenyl phosphite, tridecyl phosphite, trilauryl phosphite, tristearyl phosphite, 2,2-methylene-bis(4,6-di-tert-butylphenyl)octyl phosphite.

Specific examples of such organic phosphite compounds include "ADK Stab 1178", "ADK Stab 2112" and "ADK Stab HP-10" manufactured by ADEKA Corporation, "JP-351", "JP-360" and "JP-3CP" manufactured by Johoku Chemical Co., Ltd., and "Irgafos 168" manufactured by BASF Corporation.

Moreover, it is possible to incorporate a single thermal stabilizer or a combination of two or more arbitrary types thereof combined at arbitrary proportions.

The content of the thermal stabilizer is generally 0.001 parts by mass or higher, preferably 0.01 parts by mass or higher and more preferably 0.03 parts by mass or higher, and is generally 1 part by mass or lower, preferably 0.7 parts by mass or lower and more preferably 0.5 parts by mass or lower, relative to a total of 100 parts by mass of the polycarbonate resin (A) and the (meth)acrylate copolymer (B). If the content of the thermal stabilizer is no higher than the lower limit of the numerical range mentioned above, the thermal stabilization effect may be insufficient, and if the content of the thermal stabilizer exceeds the upper limit of the numerical range mentioned above, the effect reaches its limit, which may lead to a deterioration in economy.

Antioxidants

Examples of antioxidants include hindered phenol antioxidants. Specific examples thereof include pentaerythritol tetrakis[3-(3,5-di-tert-butyl-4-hydroxyphenyl)propionate], octadecyl-3-(3,5-di-tert-butyl-4-hydroxyphenyl)propionate, thiodiethylene-bis[3-(3,5-di-tert-butyl-4-hydroxyphenyl) propionate], N,N'-hexane-1,6-diyl-bis[3-(3,5-di-tert-butyl-4-hydroxyphenyl) propionamide], 2,4-dimethyl-6-(1-methylpentadecyl)phenol, diethyl[[3,5-bis(1,1-dimethylethyl)-4-hydroxyphenyl]methyl]phosphate, 3,3',3",5,5',5"-hexa-tert-butyl-a,a',a"-(mesitylene-2,4,6-triyl)tri-p-cresol, 4,6-bis(octylthiomethyl)-o-cresol, ethylene-bis(oxyethylene)-bis[3-(5-tert-butyl-4-hydroxy-m-tolyl)propionate], hexamethylene-bis[3-(3,5-di-tert-butyl-4-hydroxyphenyl)

propionate], 1,3,5-tris(3,5-di-tert-butyl-4-hydroxybenzyl)-1,3,5-triazine-2,4,6(1H,3H,5H)-trione, 2,6-di-tert-butyl-4-(4,6-bis(octylthio)-1,3,5-triazine-2-ylamino)phenol, 2-[1-(2-hydroxy-3,5-di-tert-pentylphenyl)ethyl]-4,6-di-tertpentylphenyl acrylate.

Of these, pentaerythritol tetrakis[3-(3,5-di-tert-butyl-4-hydroxyphenyl)propionate] and octadecyl-3-(3,5-di-tert-butyl-4-hydroxyphenyl)propionate are preferred. Specific examples of such phenolic antioxidants include "Irganox 1010" and "Irganox 1076" manufactured by BASF Corporation and "ADK Stab AO-50" and "ADK Stab AO-60" manufactured by ADEKA Corporation.

Moreover, it is possible to incorporate a single antioxidant or a combination of two or more arbitrary types thereof combined at arbitrary proportions.

The content of the antioxidant is generally 0.001 parts by mass or higher and preferably 0.01 parts by mass or higher, and is generally 1 part by mass or lower and preferably 0.5 parts by mass or lower, relative to a total of 100 parts by mass of the polycarbonate resin (A) and the (meth)acrylate copolymer (B). If the content of the antioxidant is no higher than the lower limit of the numerical range mentioned above, the effect of the antioxidant may be insufficient, and if the content of the antioxidant exceeds the upper limit of the numerical range mentioned above, the effect reaches its limit, which may lead to a deterioration in economy.

Mold Release Agents

Examples of mold release agents include aliphatic carboxylic acids, esters of aliphatic carboxylic acids and alcohols, aliphatic hydrocarbon compounds having a number average molecular weights of 200-15,000 and polysiloxane-based silicone oils.

It is possible to use a saturated or unsaturated aliphatic monohydric, dihydric or trihydric carboxylic acid as the aliphatic carboxylic acid. Here, aliphatic carboxylic acids also include alicyclic carboxylic acids. Of these, preferred aliphatic carboxylic acids are monohydric and dihydric carboxylic acids having 6-36 carbon atoms, with saturated aliphatic monohydric carboxylic acids having 6-36 carbon atoms being more preferred. Specific examples of such aliphatic carboxylic acids include palmitic acid, stearic acid, caproic acid, capric acid, lauric acid, arachic acid, behenic acid, lignoceric acid, cerotic acid, melissic acid, tetratriacontanoic acid, montanic acid, adipic acid and azelaic acid.

It is possible to use the same aliphatic carboxylic acids as those mentioned above as the aliphatic carboxylic acid in the ester of an aliphatic carboxylic acid and an alcohol. Meanwhile, examples of alcohols include saturated or unsaturated monohydric or polyhydric alcohols. These alcohols may have a substituent groups such as fluorine atoms or aryl groups. Of these, saturated monohydric or polyhydric alcohols having 30 or fewer carbon atoms are preferred, and saturated aliphatic monohydric alcohols and saturated aliphatic polyhydric alcohols having 30 or fewer carbon atoms are more preferred. Moreover, aliphatic compounds also include alicyclic compounds.

Specific examples of such alcohols include octanol, decanol, dodecanol, stearyl alcohol, behenyl alcohol, ethylene glycol, di(ethylene glycol), glycerin, pentaerythritol, 2,2-dihydroxyperfluoropropanol, neopentylene glycol, di(trimethylolpropane) and dipentaerythritol.

Moreover, the esters mentioned above may contain aliphatic carboxylic acids and/or alcohols as impurities. In addition, the esters mentioned above may be single substances, but may also be mixtures of a plurality of compounds. Furthermore, the aliphatic carboxylic acid and alcohol that bond to each other to form the ester may each be a single compound or a combination of two or more arbitrary types thereof combined at arbitrary proportions.

Specific examples of esters of aliphatic carboxylic acids and alcohols include bees wax (a mixture containing mainly myricyl palmitate), stearyl stearate, behenyl behenate, stearyl behenate, glycerin monopalmitate, glycerin monostearate, glycerin distearate, glycerin tristearate, pentaerythritol monopalmitate, pentaerythritol monostearate, pentaerythritol distearate, pentaerythritol tristearate and pentaerythritol tetrastearate.

Examples of aliphatic hydrocarbons having a number average molecular weights of 200-15,000 include liquid paraffins, paraffin waxes, microcrystalline waxes, polyethylene waxes, Fischer-Tropsch Waxes and α-olefin oligomers having 3-12 carbon atoms. Moreover, aliphatic hydrocarbons also include alicyclic hydrocarbons. In addition, these hydrocarbons may be partially oxidized.

Of these, paraffin waxes, polyethylene waxes and partially oxidized polyethylene waxes are preferred, and paraffin waxes and polyethylene waxes are more preferred.

In addition, the number average molecular weight of the aliphatic hydrocarbons mentioned above is preferably 5,000 or lower.

Moreover, the aliphatic hydrocarbon may be a single substance or a mixture of aliphatic hydrocarbons having a variety of constituent components and molecular weights, but it is preferable to use a mixture in which the primary component has a number average molecular weight that falls within the range mentioned above.

Moreover, it is possible to incorporate a single mold release agent or a combination of two or more arbitrary types thereof combined at arbitrary proportions.

The content of the mold release agent is generally 0.001 parts by mass or higher and preferably 0.01 parts by mass or higher, and is generally 2 parts by mass or lower and preferably 1 part by mass or lower, relative to a total of 100 parts by mass of the polycarbonate resin (A) and the (meth)acrylate copolymer (B). If the content of the mold release agent is no higher than the lower limit of the numerical range mentioned above, the mold release effect may be insufficient, and if the content of the mold release agent exceeds the upper limit of the numerical range mentioned above, resistance to hydrolysis may deteriorate and mold contamination may occur during injection molding.

Ultraviolet Absorbers

Examples of ultraviolet absorbers include inorganic ultraviolet absorbers such as cerium oxide and zinc oxide; and organic ultraviolet absorbers such as benzotriazole compounds, benzophenone compounds, salicylate compounds, cyanoacrylate compounds, triazine compounds, oxanilide compounds, malonic acid ester compounds and hindered amine compounds. Of these, organic ultraviolet absorbers are preferred, and benzotriazole compounds are more preferred. By selecting an organic ultraviolet absorber, the transparency and mechanical properties of the polycarbonate resin composition are improved.

Specific examples of benzotriazole compounds include 2-(2'-hydroxy-5'-methylphenyl)benzotriazole, 2-[2'-hydroxy-3',5'-bis(α,α-dimethylbenzyl)phenyl]-benzotriazole, 2-(2'-hydroxy-3',5'-di-tert-butyl-phenyl)-benzotriazole, 2-(2'-hydroxy-3'-tert-butyl-5'-methylphenyl)-5-chlorobenzotriazole, 2-(2'-hydroxy-3',5'-di-tert-butyl-phenyl)-5-chlorobenzotriazol e, 2-(2'-hydroxy-3',5'-di-tert-amyl)-benzotriazole, 2-(2'-hydroxy-5'-tert-octylphenyl)benzotriazole and 2,2'-methylene-bis[4-(1,1,3,3-tetramethylbutyl)-6-(2H-benzotriazol-2-yl)phenol], and of these, 2-(2'-hydroxy-5'-tert-octylphenyl)benzotriazole and 2,2'-methylene-bis[4-(1,1,3, 3-tetramethylbutyl)-6-(2H-benzotriazol-2-yl)phenol] are preferred, and 2-(2'-hydroxy-5'-tert-octylphenyl)benzotriazole is particularly preferred.

Specific examples of such benzotriazole compounds include "Seesorb 701", "Seesorb 702", "Seesorb 703", "Seesorb 704", "Seesorb 705" and "Seesorb 709" manufactured by Shipro Kasei Corporation, Ltd., "Biosorb 520", "Biosorb 580", "Biosorb 582" and "Biosorb 583" manufactured by Kyodo Chemical Co., Ltd., "Kemisorb 71" and "Kemisorb 72" manufactured by Chemipro Kasei Kaisha, Ltd., "Cyasorb UV5411" manufactured by Cytec Industries, "LA-32", "LA-38", "LA-36", "LA-34" and "LA-31" manufactured by ADEKA Corporation and "Tinuvin P", "Tinuvin 234", "Tinuvin 326", "Tinuvin 327" and "Tinuvin 328" manufactured by BASF Corporation.

The content of the ultraviolet absorber is generally 0.001 parts by mass or higher and preferably 0.05 parts by mass or higher, and is generally 1 part by mass or lower and preferably 0.5 parts by mass or lower, relative to a total of 100 parts by mass of the polycarbonate resin (A) and the (meth)acrylate copolymer (B). If the content of the ultraviolet absorber is lower than the lower limit of the numerical range mentioned above, the weathering resistance improvement effect is poor, and if the content of the ultraviolet absorber exceeds the upper limit of the numerical range mentioned above, mold deposits and the like occur and mold contamination readily occurs.

Moreover, it is possible to incorporate a single ultraviolet absorber or a combination of two or more arbitrary types thereof combined at arbitrary proportions.

[Method for Producing Polycarbonate Resin Composition]

Methods for producing polycarbonate resin compositions used to form molded articles are not limited, and publicly known methods for producing polycarbonate resin compositions can be widely used, an example of which is a method consisting of preliminarily mixing the polycarbonate resin (A), the (meth)acrylate copolymer (B) and other components to be blended as required in any of a variety of mixing machines, such as a tumbler or Henschel mixer, and then melt kneading using a mixer such as a Banbury mixer, a roller, a Brabender, a uniaxial kneading extruder, a biaxial kneading extruder, or a kneader. Moreover, the temperature during the melt kneading is not particularly limited, but is generally within the range 240-320° C.

[Molded Article]

A molded article is obtained by subjecting pellets, which are obtained by pelletizing the obtained polycarbonate resin composition, to any of a variety of molding methods. It is also possible to obtain a molded article by directly molding the resin composition that has been melt kneaded in an extruder, without forming pellets.

The shape of the molded article is not particularly limited and can be selected as appropriate according to the intended use of the molded article, and examples of the shape include a variety of particular shapes, such as tabular, plate-like, rod-like, sheet-like, film-like, cylindrical, annular, circular, elliptical, polygonal, profile, hollow, frame-like, box-like and panel-like.

Preferred specific examples include interior panels for vehicles, headlamp lenses for vehicles (including two-wheeled vehicles), windows, housings, game machine components, touch panels, light guide plates to be used in back light units for a variety of mobile devices such as mobile phones and mobile terminals, and light guides to be used in vehicle headlamps and the like. These molded articles are produced by conventional injection molding methods.

In cases where a molded article is formed by injection molding, the thickness of the molded article is generally 0.05-20 mm, preferably 0.1-10 mm, more preferably 0.15-6 mm, further preferably 0.2-4 mm, and particularly preferably 0.25-2 mm. By imparting the molded article with such a thickness, it is possible to reduce the degree of yellowing, improve the transparency and improve optical characteristics such as reducing optical strain. Moreover, in the present invention, thickness means the average thickness of the molded article, and in cases where the molded article has bosses, ribs, and the like, thickness means the average thickness of the molded article excluding the bosses or ribs.

In addition, in cases where a sheet or film is formed by extrusion molding, it is possible to form a multilayer laminate by laminating another resin sheet. Specific examples of sheets, films and laminate thereof include protective windows for portable display units, components for display devices, covers for display devices, components for protectors and vehicle parts.

In cases where a sheet or film is produced by extrusion molding, the thickness of the sheet or film is generally 5-1,000 μm, preferably 20-700 μm, more preferably 40-500 μm, and further preferably 50-300 μm. By imparting the molded article with such a thickness, it is possible to reduce the degree of yellowing, improve the transparency and improve optical characteristics such as reducing optical distortion.

The method for forming the molded article is not particularly limited, and a conventional publicly known molding method can be used, examples of which include injection molding methods, injection compression molding methods, extrusion molding methods, profile extrusion methods, transfer molding methods, hollow molding methods, gas assisted hollow molding methods, blow molding methods, extrusion blow molding methods, IMC (in-mold coating) molding methods, rotational molding methods, multilayer molding methods, two component molding methods, insert molding methods, sandwich molding methods, foaming molding methods and pressure molding methods.

By molding the polycarbonate resin composition of the present invention by means of injection molding in particular, the problem of whitening of a molded article hardly occurs, and it is possible to obtain a molded article having an excellent appearance. When carrying out thin wall formation at high temperatures and high speeds in particular, the edges of a molded article readily whiten, but in the case of the polycarbonate resin composition of the present invention, whitening hardly occurs and a molded article having an excellent appearance can be obtained even if the cylinder temperature is 260° C. or higher, 280° C. or higher, or even 300-340° C. or if the injection speed is 100 mm/sec or higher, 200 mm/sec or higher, or even 500-5,000 mm/sec. Moreover, a preferred upper limit for the cylinder temperature is 330° C., and more preferably 320° C., and a preferred upper limit for the injection speed is 3,000 mm/sec, more preferably 1,000 mm/sec, further preferably 500 mm/sec, particularly preferably 400 mm/sec, and most preferably 300 mm/sec.

[Cured Product Layer]

The surface of the polycarbonate resin molded article obtained by molding polycarbonate resin composition of the present invention has sufficient hardness in its own right, but it is preferable to coat the surface with a layer of a cured product of an energy ray-curable acrylic resin composition. By forming this type of cured product layer, it is possible to achieve an even higher surface hardness.

Energy rays include radiation such as ultraviolet radiation, electron radiation, α radiation, β radiation and γ radiation, but an ultraviolet curable material is preferred from perspectives such as applicability, workability and working environment.

The energy ray-curable acrylic resin composition can be a resin composition which contains an acrylic photopolymerizable prepolymer or photopolymerizable monomer as a primary component and to which a photopolymerization initiator or the like is further added.

Examples of acrylic photopolymerizable prepolymers include urethane (meth)acrylates, polyester (meth)acrylates, epoxy (meth)acrylates and melamine (meth)acrylates.

In addition, examples of acrylic photopolymerizable monomers include methyl (meth)acrylate, ethyl (meth)acrylate, propyl (meth)acrylate, butyl (meth)acrylate, 2-ethylhexyl (meth)acrylate, isodecyl (meth)acrylate, lauryl (meth) acrylate, stearyl (meth)acrylate, allyl (meth)acrylate, cyclohexyl (meth)acrylate, methylcyclohexyl (meth)acrylate, isobornyl (meth)acrylate, 2-hydroxyethyl (meth)acrylate, 2-hydroxypropyl (meth)acrylate, glycerol (meth)acrylate, glycidyl (meth)acrylate, benzyl (meth)acrylate, 2-ethoxyethyl (meth)acrylate, 2-(2-ethoxyethoxyl)ethyl (meth)acrylate, butoxyethyl (meth)acrylate, 2-methoxyethyl (meth)acrylate, methoxyethylene glycol (meth)acrylate, methoxytri(ethylene glycol) (meth)acrylate, methoxypoly(ethylene glycol) (meth)acrylate, 2-methoxypropyl (meth) acrylate, methoxydi(propylene glycol) (meth)acrylate, methoxytri(propylene glycol) (meth)acrylate, methoxypoly(propylene glycol) (meth)acrylate, poly(ethylene glycol) (meth)acrylate and poly(propylene glycol) (meth)acrylate.

In addition, these can be a single compound or a mixture of two or more types thereof.

Examples of photopolymerization initiators include benzoin compounds such as benzoin, benzoin methyl ether, benzoin ethyl ether, benzoin propyl ether and benzoin isobutyl ether; acetophenone compounds such as acetophenone, 2,2-diethoxy-2-phenylacetophenone, 1,1-dichloroacetophenone, 2-hydroxy-2-methyl-phenylpropan-1-one, diethoxyacetophenone, 1-hydroxycyclohexyl phenyl ketone and 2-methyl-1-[4-(methylthio)phenyl]-2-morpholinopropan-1-one; anthraquinone compounds such as 2-ethylanthraquinone, 2-t-butylanthraquinone, 2-chloroanthraquinone and 2-amylanthraquinone; thioxanthone compounds such as 2,4-diethylthioxanthone, 2-isopropylthioxanthone and 2-chlorothioxanthone; ketal compounds such as acetophenone dimethyl ketal and benzyl dimethyl ketal; benzophenone compounds such as benzophenone, 4-benzoyl-4'-methyldiphenyl sulfide and 4,4'-bis(methylamino)benzophenone; and phosphine oxide compounds such as 2,4,6-trimethylbenzoyldiphenyl phosphine oxide and bis(2,4,6-trimethylbenzoyl)-phenyl phosphine oxide.

In addition, these can be a single compound or a mixture of two or more types thereof.

A variety of additives, such as photostabilizers, ultraviolet absorbers, antioxidants, anti-foaming agents, viscosity modifiers, anti-dripping agents, flame retardants, pigments/dyes and anti-static agents, may be added to the energy ray-curable acrylic resin composition.

A cured product layer is formed by coating an energy ray-curable acrylic resin composition, such as those mentioned above, on the surface of a polycarbonate resin molded article. A molded article consisting of the polycarbonate resin composition of the present invention contains a (meth) acrylate copolymer, and therefore exhibits good compatibility with acrylic resin compositions and can more effectively improve the surface hardness.

The coating method can be appropriately selected from among publicly known coating methods according to the shape of the molded article, and examples of coating methods include bar coating methods, dip coating methods, flow coating methods, spray coating methods, spin coating methods and roller coating methods.

It is generally preferable for the atmosphere in which the radiation with active energy rays is carried out to be an inert gas atmosphere such as nitrogen gas or carbon dioxide gas, but it is possible to form a satisfactory cured coating layer even if the content of oxygen in the atmosphere is somewhat high, depending on the type of acrylic resin composition used.

The thickness of the cured coating layer is preferably approximately 1-30 μm, and more preferably 5 μm or higher, and the upper limit of this thickness is more preferably 25 μm or lower.

A molded article obtained by molding the polycarbonate resin composition of the present invention has excellent mechanical characteristics and exhibits high surface hardness and excellent abrasion resistance, and can therefore be advantageously used in products such as those listed below.

Window glass for structures (buildings, houses, greenhouses, and the like); window glass for vehicles, aircraft and construction equipment; roofs for garages, arcades, and the like; sunroofs, roof panels, sunshades; and a variety of inspection windows;

Headlamp lenses, traffic light lenses, optical equipment lenses; lens covers; mirrors, spectacles, goggles, bike windshields; solar cell covers; protective covers;

Covers for a variety of vehicle lamps, such as headlamps, inner lenses and tail lamps; interior panels for vehicles;

Covers for display devices, components for display panels, parts for game machines (Pachinko pinball machines and the like);

Housings for electrical and electronic equipment and OA equipment, such as a variety of mobile terminals, cameras and gaming devices; helmets;

Sheets, films and laminates thereof.

In particular, in cases where a molded article obtained by molding the polycarbonate resin composition of the present invention is used in a sheet, film or laminate thereof, such as an interior panel for a vehicle, a lamp lens for a vehicle, a window, a housing, a touch panel, a light guide, or the like, the molded article is suitable for use in a protective window for a portable display unit, a component for a display device, a cover for a display device, a component for a protective device or a vehicle part.

EXAMPLES

The present invention will now be explained in detail through the use of working examples. However, it should be understood that the present invention is not limited to the working examples given below.

The raw materials used in the working examples and comparative examples given below are as follows.

[Polycarbonate Resin (A)]

A polycarbonate resin obtained in Synthesis Example 1 below was used as polycarbonate resin (A1-1):

(1) Production of Polycarbonate Resin (A1-1):

26.14 moles (6.75 kg) of 2,2-bis(3-methyl-4-hydroxyphenyl)propane (hereinafter referred to as "BPC") and 26.66 moles (5.71 kg) of diphenyl carbonate were placed inside a SUS reactor (having an internal volume of 40 L) fitted with a stirrer and distillation condenser, the inside of the reactor was purged with nitrogen gas, and the temperature was then increased to 220° C. over a period of 30 minutes in a nitrogen gas atmosphere.

Next, the reaction liquid in the reactor was stirred, cesium carbonate ($Cs_2CO_3$) was added as a transesterification catalyst to the molten reaction liquid at a quantity of $1.5 \times 10^{-6}$ moles relative to 1 mole of BPC, and the reaction liquid was stirred and developed for 30 minutes at 220° C. in a nitrogen gas atmosphere. Next, the pressure inside the reactor was reduced to 100 Torr over a period of 40 minutes at this temperature, the reaction was allowed to continue for 100 minutes, and phenol was distilled off.

Next, over a period of 60 minutes, the temperature inside the reactor was increased to 280° C. and the pressure inside the reactor was reduced to 3 Torr, and a quantity of phenol corresponding to almost the entire theoretical distillation quantity was distilled off. Next, the pressure inside the reactor was maintained at less than 1 Torr at the same temperature, and the reaction was allowed to continue for a further 80 minutes, thereby completing the polycondensation reaction. Here, the speed of rotation of the stirrer was 38 rpm, the temperature of the reaction liquid immediately prior to the completion of the reaction was 300° C., and the force of the stirring was 0.90 kW.

Next, the reaction liquid, while still molten, was transferred to a twin screw extruder, butyl p-toluenesulfonate was supplied via a first supply port on the twin screw extruder at a quantity corresponding to 4 times the molar quantity of cesium carbonate and kneaded with the reaction liquid, after which the reaction liquid was extruded in the form of strands through a die on the twin screw extruder and then cut with a cutter, thereby obtaining polycarbonate resin pellets.

The physical properties of the obtained polycarbonate resin (A1-1) were as follows.

Pencil hardness: 2H
Viscosity average molecular weight (Mv): 24,000

(2) Production of Polycarbonate Resin (A1-2):

26.14 moles (6.75 kg) of BPC and 26.79 moles (5.74 kg) of diphenyl carbonate were placed inside a SUS reactor (having an internal volume of 10 L) fitted with a stirrer and distillation condenser, the inside of the reactor was purged with nitrogen gas, and the temperature was then increased to 220° C. over a period of 30 minutes in a nitrogen gas atmosphere.

Next, the reaction liquid in the reactor was stirred, cesium carbonate ($Cs_2CO_3$) was added as a transesterification catalyst to the molten reaction liquid at a quantity of $1.5 \times 10^{-6}$ moles relative to 1 mole of BPC, and the reaction liquid was stirred and developed for 30 minutes at 220° C. in a nitrogen gas atmosphere. Next, the pressure inside the reactor was reduced to 100 Torr over a period of 40 minutes at this temperature, the reaction was allowed to continue for 100 minutes, and phenol was distilled off.

Next, over a period of 60 minutes, the temperature inside the reactor was increased to 284° C. and the pressure inside the reactor was reduced to 3 Torr, and a quantity of phenol corresponding to almost the entire theoretical distillation quantity was distilled off. Next, the pressure inside the reactor was maintained at less than 1 Torr at the same temperature, and the reaction was allowed to continue for a further 60 minutes, thereby completing the polycondensation reaction. Here, the speed of rotation of the stirrer was 38 rpm, the temperature of the reaction liquid immediately prior to the completion of the reaction was 289° C., and the force of the stirring was 1.00 kW.

Next, the reaction liquid, while still molten, was transferred to a twin screw extruder, butyl p-toluenesulfonate was supplied via a first supply port on the twin screw extruder at a quantity corresponding to 4 times the molar quantity of cesium carbonate and kneaded with the reaction liquid, after which the reaction liquid was extruded in the form of strands through a die on the twin screw extruder and then cut with a cutter, thereby obtaining polycarbonate resin pellets.

The physical properties of the obtained polycarbonate resin (A1-2) were as follows.

Pencil hardness: 2H
Viscosity average molecular weight (Mv): 26,000

(3) Production of Polycarbonate Resin (A1-3):

26.14 moles (6.75 kg) of BPC and 26.79 moles (5.74 kg) of diphenyl carbonate were placed inside a SUS reactor (having an internal volume of 10 L) fitted with a stirrer and distillation condenser, the inside of the reactor was purged with nitrogen gas, and the temperature was then increased to 220° C. over a period of 30 minutes in a nitrogen gas atmosphere.

Next, the reaction liquid in the reactor was stirred, cesium carbonate ($Cs_2CO_3$) was added as a transesterification catalyst to the molten reaction liquid at a quantity of $1.5 \times 10^{-6}$ moles relative to 1 mole of BPC, and the reaction liquid was stirred and developed for 30 minutes at 220° C. in a nitrogen gas atmosphere. Next, the pressure inside the reactor was reduced to 100 Torr over a period of 40 minutes at this temperature, the reaction was allowed to continue for 100 minutes, and phenol was distilled off.

Next, over a period of 60 minutes, the temperature inside the reactor was increased to 284° C. and the pressure inside the reactor was reduced to 3 Torr, and a quantity of phenol corresponding to almost the entire theoretical distillation quantity was distilled off. Next, the pressure inside the reactor was maintained at less than 1 Torr at the same temperature, and the reaction was allowed to continue for a further 60 minutes, thereby completing the polycondensation reaction. Here, the speed of rotation of the stirrer was 38 rpm, the temperature of the reaction liquid immediately prior to the completion of the reaction was 289° C., and the force of the stirring was 0.75 kW.

Next, the reaction liquid, while still molten, was transferred to a twin screw extruder, butyl p-toluenesulfonate was supplied via a first supply port on the twin screw extruder at a quantity corresponding to 4 times the molar quantity of cesium carbonate and kneaded with the reaction liquid, after which the reaction liquid was extruded in the form of strands through a die on the twin screw extruder and then cut with a cutter, thereby obtaining polycarbonate resin pellets.

The physical properties of the obtained polycarbonate resin (A1-3) were as follows.

Pencil hardness: 2H
Viscosity average molecular weight (Mv): 22,000

(4) Production of Polycarbonate Resin (A1-4) (Using an Interfacial Polymerization Method):

An aqueous phase, which was obtained by dissolving 13.80 kg/hour of BPC, 5.8 kg/hour of sodium hydroxide (NaOH) and 93.5 kg/hour of water at 35° C. in the presence of 0.017 kg/hour of hydrosulfite and then cooling to 25° C., and an organic phase of 61.9 kg/hour of dichloromethane cooled to 5° C. were supplied to Teflon™ pipes, each having an internal diameter of 6 mm and an external diameter of 8 mm, and these phases were brought into contact with 7.2 kg/hour of liquefied phosgene, which was cooled to 0° C. and introduced separately, in a Teflon™ pipe reactor, which was connected to these Teflon pipes and which had an internal diameter of 6 mm and a length of 34 m.

These raw materials are subjected to phosgenation and oligomerization reactions with the phosgene while flowing for 20 seconds in the pipe reactor at a linear velocity of 1.7 m/sec. At this point, the reaction temperature reached an overhead temperature of 60° C. in an insulated system. The temperature of the reactants was adjusted by external cooling to 35° C. prior to introduction into a subsequent oligomerization vessel.

When carrying out the oligomerization, 5 g/hour (corresponding to $0.9 \times 10^{-3}$ moles relative to 1 mole of BPC) of triethylamine was used as a catalyst and 0.153 kg/hour of p-t-butylphenol was used as a molecular weight-adjusting agent, and these were introduced into the oligomerization vessel.

An oligomerized emulsion, which was obtained in the pipe reactor in this way, was then placed in a reaction tank having an internal volume of 50 L and fitted with a stirrer, and oligomerized by being stirred at 30° C. in a nitrogen gas ($N_2$) atmosphere, thereby consuming unreacted BPC sodium salt (BPC-Na) present in the aqueous phase, after which the aqueous phase and oil phase were subjected to stationary separation, thereby obtaining a dichloromethane solution of an oligomer.

23 kg of this dichloromethane solution of an oligomer was placed in a reaction tank having an internal volume of 70 L and fitted with a Pfaudler blade, 10 kg of dichloromethane for dilution was added to the reaction tank, after which 2.2 kg of a 25 wt. % aqueous solution of sodium hydroxide, 6 kg of water and 2.2 g (corresponding to $1.1 \times 10^{-3}$ moles relative to 1 mole of BPC) of triethylamine were added to the reaction tank and stirred at 30° C. in a nitrogen gas atmosphere after which a polycondensation reaction was carried out for 60 minutes, thereby obtaining a polycarbonate resin.

Next, 30 kg of dichloromethane and 7 kg of water were added and stirred for 20 minutes, after which the stirring was stopped and the aqueous phase and organic phase were separated. 20 kg of 0.1 N hydrochloric acid was added to the separated organic phase and stirred for 15 minutes, the triethylamine and small quantities of remaining alkaline components were extracted, after which the stirring was stopped and the aqueous phase and organic phase were separated.

20 kg of pure water was then added to the separated organic phase and stirred for 15 minutes, after which the stirring was stopped and the aqueous phase and organic phase were separated. This process was repeated until chloride ions were not detected in the extracted effluent (3 times). The obtained purified polycarbonate solution was granulated by being fed into warm water at 40° C. and then dried, thereby obtaining a granular polycarbonate resin powder.

The physical properties of the obtained polycarbonate resin (A1-4) were as follows.
    Pencil hardness: 2H
    Viscosity average molecular weight (Mv): 30,000
    (5) Production of Polycarbonate Resin (A1-5):

A mixture was prepared by adding an aqueous solution of cesium carbonate to 20.11 moles (4.59 kg) of bisphenol A (hereinafter referred to as "BPA"), 113.99 moles (29.22 kg) of BPC and 141.47 moles (30.31 kg) of diphenyl carbonate (hereinafter sometimes referred to as "DPC") so that the quantity of cesium carbonate was 2 μmol relative to 1 mole of dihydroxy compounds. Next, the mixture was placed in a first reactor which had an internal volume of 200 L and which was fitted with a stirrer, a heat medium jacket, a vacuum pump and a reflux condenser.

Next, a process of reducing the pressure inside the first reactor to 1.33 kPa (10 Torr) and then returning the inside of the first reactor to atmospheric pressure with nitrogen was repeated 5 times, after which the inside of the first reactor was purged with nitrogen. Following the nitrogen purging, the temperature of the first reactor was gradually increased by means of a heat medium having a temperature of 230° C. in the heat medium jacket, thereby dissolving the mixture. The stirrer was then rotated at 55 rpm and the temperature inside the first reactor was maintained at 220° C. by controlling the temperature inside the heat medium jacket. Next, while removing phenol, which was by-produced in the oligomerization reaction between the BPC and DPC in the first reactor, the pressure inside the first reactor was reduced from an absolute pressure of 101.3 kPa (760 Torr) to 13.3 kPa (100 Torr) over a period of 40 minutes.

Next, the pressure inside the first reactor was maintained at 13.3 kPa, and a transesterification reaction was carried out for a period of 150 minutes while continuing to distill off phenol.

The pressure inside the system was then returned to an absolute pressure of 101.3 kPa with nitrogen and then increased to a gauge pressure of 0.2 MPa, and the oligomer in the first reactor was transferred to a second reactor via transfer piping which had been heated to 200° C. or higher in advance. Moreover, the second reactor had an internal volume of 200 L, was fitted with a stirrer, a heat medium jacket, a vacuum pump and a reflux condenser, had an internal pressure of atmospheric pressure, and had an internal temperature that was controlled to 240° C.

Next, the oligomer transferred to the second reactor was stirred at 8 rpm, the temperature inside the second reactor was increased by means of the heat medium jacket, and the pressure inside the second reactor was reduced from an absolute pressure of 101.3 kPa to 13.3 kPa over a period of 40 minutes. Next, the temperature increase was continued, the internal pressure was reduced from an absolute pressure of 13.3 kPa to 399 Pa (3 Torr) over a period of 40 minutes, and phenol that had been distilled off was removed to outside the system. The temperature increase was continued, and once the pressure inside the second reactor reached an absolute pressure of 70 Pa (approximately 0.5 Torr), the pressure was maintained at 70 Pa and a polycondensation reaction was carried out. The final temperature inside the second reactor was 280° C. When the stirrer in the second reactor reached a prescribed stirring force that had been set in advance, the polycondensation reaction was terminated.

Next, the reaction liquid, while still molten, was transferred to a twin screw extruder, butyl p-toluenesulfonate was supplied via a first supply port on the twin screw extruder at a quantity corresponding to 4 times the molar quantity of cesium carbonate and kneaded with the reaction liquid, after which the reaction liquid was extruded in the form of strands through a die on the twin screw extruder and then cut with a cutter, thereby obtaining polycarbonate resin pellets.

The physical properties of the obtained polycarbonate resin (A1-5) were as follows.
    Pencil hardness: 2H
    Viscosity average molecular weight (Mv): 26,000
    (6) Production of Polycarbonate Resin (A1-6):

A mixture was prepared by adding an aqueous solution of cesium carbonate to 40.83 moles (9.32 kg) of BPA, 95.26 moles (24.42 kg) of BPC and 143.57 moles (30.76 kg) of DPC so that the quantity of cesium carbonate was 2 μmol relative to 1 mole of dihydroxy compounds. Next, the mixture was placed in a first reactor which had an internal volume of 200 L and which was fitted with a stirrer, a heat medium jacket, a vacuum pump and a reflux condenser.

Next, a process of reducing the pressure inside the first reactor to 1.33 kPa (10 Torr) and then returning the inside of the first reactor to atmospheric pressure with nitrogen was repeated 5 times, after which the inside of the first reactor was purged with nitrogen. Following the nitrogen purging, the temperature of the first reactor was gradually increased by means of a heat medium having a temperature of 230° C. in the heat medium jacket, thereby dissolving the mixture. The stirrer was then rotated at 55 rpm and the temperature inside the first reactor was maintained at 220° C. by controlling the temperature inside the heat medium jacket. Next, while removing phenol, which was by-produced in the oligomerization reaction between the BPC and DPC in the first reactor, the pressure inside the first reactor was reduced from an absolute pressure of 101.3 kPa (760 Torr) to 13.3 kPa (100 Torr) over a period of 40 minutes.

Next, the pressure inside the first reactor was maintained at 13.3 kPa, and a transesterification reaction was carried out for a period of 150 minutes while continuing to distill off phenol.

The pressure inside the system was then returned to an absolute pressure of 101.3 kPa with nitrogen and then increased to a gauge pressure of 0.2 MPa, and the oligomer in the first reactor was transferred to a second reactor via transfer piping which had been heated to 200° C. or higher in advance. Moreover, the second reactor had an internal volume of 200 L, was fitted with a stirrer, a heat medium jacket, a vacuum pump and a reflux condenser, had an internal pressure of atmospheric pressure, and had an internal temperature that was controlled to 240° C.

Next, the oligomer transferred to the second reactor was stirred at 8 rpm, the temperature inside the second reactor was increased by means of the heat medium jacket, and the pressure inside the second reactor was reduced from an absolute pressure of 101.3 kPa to 13.3 kPa over a period of 40 minutes. Next, the temperature increase was continued, the internal pressure was reduced from an absolute pressure of 13.3 kPa to 399 Pa (3 Torr) over a period of 40 minutes, and phenol that had been distilled off was removed to outside the system. The temperature increase was continued, and once the pressure inside the second reactor reached an absolute pressure of 70 Pa (approximately 0.5 Torr), the pressure was maintained at 70 Pa and a polycondensation reaction was carried out. The final temperature inside the second reactor was 280° C. When the stirrer in the second reactor reached a prescribed stirring force that had been set in advance, the polycondensation reaction was terminated.

Next, the reaction liquid, while still molten, was transferred to a twin screw extruder, butyl p-toluenesulfonate was supplied via a first supply port on the twin screw extruder at a quantity corresponding to 4 times the molar quantity of cesium carbonate and kneaded with the reaction liquid, after which the reaction liquid was extruded in the form of strands through a die on the twin screw extruder and then cut with a cutter, thereby obtaining polycarbonate resin pellets.

The physical properties of the obtained polycarbonate resin (A1-6) were as follows.

Pencil hardness: H

Viscosity average molecular weight (Mv): 25,500

The following polycarbonate resin was used as polycarbonate resin (A2).

Polycarbonate resin obtained by interfacial polymerization using bisphenol A as a starting material Product name "Iupilon S-3000" manufactured by Mitsubishi Engineering-Plastics Corporation Pencil hardness: 2B Viscosity average molecular weight (Mv): 21,000

Moreover, the viscosity average molecular weight (Mv) of the polycarbonate resin was calculated by dissolving the polycarbonate resin in dichloromethane (at a concentration of 6.0 g/L), measuring the specific viscosity ($\eta_{sp}$) at 20° C. using an Ubbelohde viscometer, and then calculating the viscosity average molecular weight (Mv) by using the following formulae.

$$\eta_{sp}/C=[\eta](1+0.281\eta_{sp})$$

$$[\eta]=1.23\times10^{-4}\,Mv^{0.83}$$

In addition, the pencil hardness of the polycarbonate resin is a value obtained in accordance with JIS K 7152 by measuring the surface hardness of a multipurpose sample, which was obtained by injection molding using an injection molding machine (J55AD manufactured by Japan Steel Works, Ltd.) at a barrel temperature of 280° C. and a mold temperature of 80° C., in accordance with JIS K 5600-5-4 using a pencil hardness tester (manufactured by Toyo Seiki Seisaku-sho, Ltd.) under a load of 1,000 g.

[(Meth)Acrylate Copolymer (B)]

A (meth)acrylate copolymer obtained in the following production example was used as the (meth)acrylate copolymer (B).

200 parts by mass of deionized water, 0.3 parts by mass of the dispersing agent described below, 0.5 parts by mass of sodium sulfate, 0.3 parts by mass of 2,2'-azobisisobutyronitrile, 33 parts by mass of phenyl methacrylate, 66 parts by mass of methyl methacrylate, 1 part by mass of methyl acrylate and 1.8 parts by mass of n-octylmercaptan were placed in a heatable reaction vessel fitted with a thermometer, a nitrogen inlet tube, a reflex condenser and a stirring device, and the reaction vessel was purged with nitrogen and heated to 80° C. A (meth)acrylate copolymer was obtained by stirring for 4 hours, and subjecting the obtained bead-like polymer to washing with water and then drying.

Dispersing agent: The dispersing agent used was obtained by mixing a polymer, which was obtained by copolymerizing 70 parts by mass of potassium methacrylate and 30 parts by mass of methyl methacrylate, and a polymer, which was obtained by copolymerizing 65 parts by mass of sodium 2-sulfoethyl methacrylate, 10 parts by mass of potassium methacrylate and 25 parts by mass of methyl methacrylate, at a mass ratio of 1:1, and then obtaining a 10% aqueous solution of this polymer mixture.

The obtained (meth)acrylate copolymer had an aromatic (meth)acrylate unit (b1)/methyl methacrylate (b2) mass ratio of 33/67, a pencil hardness of 2H, and a mass average molecular weight of 14,000. This mass average molecular weight is polystyrene conversion mass average molecular weight which is calculated by gel permeation chromatography using chloroform as a solvent.

[Stabilizer]

Phosphorus-based stabilizer:

Tris(2,4-di-tert-butylphenyl)phosphite

Product name "ADK Stab 2112" manufactured by ADEKA Corporation (shown in the tables as "Stabilizer")

[Antioxidant]

Hindered phenol antioxidant:

Pentaerythritol tetrakis[3-(3,5-di-tert-butyl-4-hydroxyphenyl)propionate]

Product name "Irganox 1010" manufactured by BASF Corporation (shown in the tables as "Antioxidant")

Working Examples 1-14 and Comparative Examples 1-5

[Method for Producing Polycarbonate Resin Composition Pellets]

The above-mentioned resins and additives were blended and mixed according to the compositions (parts by mass) shown in the tables below, and kneaded using a twin screw extruder ("TEX30XCT" manufactured by Japan Steel Works, Ltd.) at a barrel temperature of 280° C., thereby producing polycarbonate resin compositions, which were then formed into pellets.

[Preparation of Samples for Evaluating Pencil Hardness and Haze]

The pellets described above were dried for 5 hours at 80° C., and then injection molded at an injection speed of 30 mm/sec into plate-like samples having dimensions of 90 mm×50 mm and a thickness of 3 mm using an injection molding machine ("J55-60H" manufactured by Japan Steel Works, Ltd.) at a preset cylinder temperature of 260-280° C., a mold temperature of 80° C. and a screw rotation speed of 100 rpm. Moreover, samples used to measure the pencil hardness values of polycarbonate resins (A1-1) to (A1-6) and (A2) were prepared using the same method as that described above.

[Preparation of Samples for Evaluating Total Light Transmittance]

The pellets described above were dried for 5 hours at 80° C., and then injection molded at an injection speed of 30 mm/sec into three-step plates (having a three-step shape having a width of 50 mm, a length of 90 mm and thicknesses of 3 mm, 2 mm and 1 mm) using an injection molding machine ("J55-60H" manufactured by Japan Steel Works, Ltd.) at a preset cylinder temperature of 260-280° C., a mold temperature of 80° C. and a screw rotation speed of 100 rpm.

[Preparation of ISO Multipurpose Samples]

The pellets described above were dried for 5 hours at 80° C., and then formed into ISO multipurpose samples (having a thickness of 3 mm) using an injection time of 2.0 sec and a molding cycle of 40 sec by using an injection molding machine ("J55-60H" manufactured by Japan Steel Works, Ltd.) at a preset cylinder temperature of 260-280° C., a mold temperature of 80° C. and a screw rotation speed of 100 rpm.

[Measurement of Pencil Hardness]

In accordance with JIS K 5600-5-4, the pencil hardness of the plate-like sample prepared as described above (having dimensions of 90 mm×50 mm and a thickness of 3 mm) was measured using a "pencil hardness tester" manufactured by Toyo Seiki Seisaku-sho, Ltd. under a load of 1,000 g.

[Measurement of Haze]

In accordance with JIS K 7136, the haze value of the plate-like sample prepared as described above (having dimensions of 90 mm×50 mm and a thickness of 3 mm) was measured using an NDH6000 haze meter manufactured by Nippon Denshoku Industries Co., Ltd. A lower haze value indicates excellent transparency, while a higher haze value indicates a cloudy appearance.

[Total Light Transmittance]

In accordance with JIS K 7105, the total light transmittance of the portion, having a thickness of 3 mm, of the three-step plate prepared as described above was measured using an NDH-2000 haze meter manufactured by Nippon Denshoku Industries Co., Ltd.

[Charpy Impact Strength]

In accordance with ISO 179, notches were cut in the ISO multipurpose sample prepared as described above (having a thickness of 3 mm), and the Charpy impact strength (units: kJ/m2) of the notched sample was measured at 23° C.

[Presence/Absence of Whitening During Molding]

The pellets described above were dried for 5 hours at 80° C., injection molded at an injection speed of 200 mm/sec and 300 mm/sec into three-step plates (having a three-step shape having a width of 50 mm, a length of 90 mm and thicknesses of 3 mm, 2 mm and 1 mm) using an injection molding machine ("J55-60H" manufactured by Japan Steel Works, Ltd.) at a preset cylinder temperature of 260-280° C., a mold temperature of 80° C. and a screw rotation speed of 100 rpm, and it was judged whether or not whitening could be seen at the periphery of the obtained three-step plates. Cases where no whitening whatsoever was seen at the periphery of the plate are shown in the tables as "No", while cases where whitening was seen at most parts of the periphery of the plate or at least at a part of the periphery of the plate are shown in the tables as "Yes".

[MVR]

The pellets were dried for 4 hours or more at 80° C., and the MVR value (units: $cm^3/10$ min) was measured in accordance with ISO 1133 in a melt indexer manufactured by Toyo Seiki Seisaku-sho, Ltd. at a measurement temperature of 300° C. under a load of 11.8 N.

The results of these tests are shown in Tables 1 to 3.

TABLE 1

| Component | Symbol | | Working Example | | | | | | |
|---|---|---|---|---|---|---|---|---|---|
| | | | 1 | 2 | 3 | 4 | 5 | 6 | 7 |
| Polycarbonate resin (A) | (A1-1) Mv = 24,000 | Parts by mass | 100 | 85 | 70 | | | | |
| | (A1-2) Mv = 26,000 | Parts by mass | | | | 100 | 100 | 85 | 70 |
| | (A1-3) Mv = 22,000 | Parts by mass | | | | | | | |
| | (A1-4) Interfacial polymerization Mv = 30,000 | Parts by mass | | | | | | | |
| | (A1-5) C/A = 85/15 Mv = 26,000 | Parts by mass | | | | | | | |
| | (A1-6) C/A = 70/30 Mv = 25,500 | Parts by mass | | | | | | | |

TABLE 1-continued

|  |  |  | Working Example | | | | | | |
|---|---|---|---|---|---|---|---|---|---|
| Component | Symbol |  | 1 | 2 | 3 | 4 | 5 | 6 | 7 |
| (A2) Mv = 21,000 | Parts by mass |  |  | 15 | 30 |  |  | 15 | 30 |
| (Meth)acrylate copolymer (B) | Parts by mass |  | 33 | 33 | 33 | 25 | 33 | 33 | 33 |
| Stabilizer | Parts by mass |  | 0.04 | 0.04 | 0.04 | 0.04 | 0.04 | 0.04 | 0.04 |
| Antioxidant | Parts by mass |  | 0.13 | 0.13 | 0.13 | 0.13 | 0.13 | 0.13 | 0.13 |
| Haze | % |  | 1.0 | 0.9 | 0.9 | 1.0 | 0.9 | 1.0 | 0.9 |
| Total light transmittance | % |  | 90 | 90 | 90 | 90 | 90 | 90 | 90 |
| Pencil hardness | — |  | 3H | 3H | 2H | 3H | 3H | 3H | 2H |
| Whitening during molding | Injection speed: 200 mm/sec |  | No | No | No | No | No | No | No |
|  | Injection speed: 300 mm/sec |  | No | No | No | No | No | No | No |
| Charpy impact strength | kJ/m$^2$ |  | 3 | 3 | 3 | 3 | 3 | 3 | 3 |
| MVR | cm$^3$/10 min |  | 43 | 34 | 31 | 24 | 29 | 25 | 23 |

TABLE 2

|  |  |  | Working Example | | | | | | |
|---|---|---|---|---|---|---|---|---|---|
| Component | Symbol |  | 8 | 9 | 10 | 11 | 12 | 13 | 14 |
| Polycarbonate resin (A) | (A1-1) Mv = 24,000 | Parts by mass |  |  |  |  |  |  |  |
|  | (A1-2) Mv = 26,000 | Parts by mass |  |  |  |  |  |  |  |
|  | (A1-3) Mv = 22,000 | Parts by mass | 100 | 85 | 70 |  |  |  |  |
|  | (A1-4) Interfacial polymerization Mv = 30,000 | Parts by mass |  |  |  | 100 | 85 |  |  |
|  | (A1-5) C/A = 85/15 Mv = 26,000 | Parts by mass |  |  |  |  |  | 100 |  |
|  | (A1-6) C/A = 70/30 Mv = 25,500 | Parts by mass |  |  |  |  |  |  | 100 |
|  | (A2) Mv = 21,000 | Parts by mass |  | 15 | 30 |  | 15 |  |  |
| (Meth)acrylate copolymer (B) | Parts by mass |  | 33 | 33 | 33 | 33 | 33 | 33 | 33 |
| Stabilizer | Parts by mass |  | 0.04 | 0.04 | 0.04 | 0.04 | 0.04 | 0.04 | 0.04 |
| Antioxidant | Parts by mass |  | 0.13 | 0.13 | 0.13 | 0.13 | 0.13 | 0.13 | 0.13 |
| Haze | % |  | 1.0 | 1.0 | 0.9 | 0.9 | 0.9 | 1.0 | 1.0 |
| Total light transmittance | % |  | 90 | 90 | 90 | 90 | 90 | 90 | 90 |
| Pencil hardness | — |  | 3H | 3H | 2H | 3H | 3H | 3H | 2H |
| Whitening during molding | Injection speed: 200 mm/sec |  | No | No | No | No | No | No | No |
|  | Injection speed: 300 mm/sec |  | No | No | No | No | No | No | No |
| Charpy impact strength | kJ/m$^2$ |  | 2 | 3 | 2 | 3 | 3 | 3 | 3 |
| MVR | cm$^3$/10 min |  | 53 | 51 | 50 | 15 | 17 | 24 | 24 |

TABLE 3

|  |  |  | Comparative Example | | | | |
|---|---|---|---|---|---|---|---|
| Component | Symbol |  | 1 | 2 | 3 | 4 | 5 |
| Polycarbonate resin (A) | (A1-1) Mv = 24,000 | Parts by mass |  | 100 | 85 | 70 |  |
|  | (A1-2) Mv = 26,000 | Parts by mass |  |  |  |  |  |
|  | (A1-3) Mv = 22,000 | Parts by mass |  |  |  |  |  |
|  | (A1-4) Interfacial polymerization | Parts by mass |  |  |  |  |  |

TABLE 3-continued

|  |  | Comparative Example | | | | |
|---|---|---|---|---|---|---|
| Component | Symbol | 1 | 2 | 3 | 4 | 5 |
| Mv = 30,000 (A1-5) C/A = 85/15 Mv = 26,000 | Parts by mass | | | | | |
| (A1-6) C/A = 70/30 Mv = 25,500 | Parts by mass | | | | | |
| (A2) Mv = 21,000 | Parts by mass | 100 | | 15 | 30 | 100 |
| (Meth)acrylate copolymer (B) | Parts by mass | | | | | 33 |
| Stabilizer | Parts by mass | 0.04 | 0.04 | 0.04 | 0.04 | 0.04 |
| Antioxidant | Parts by mass | 0.13 | 0.13 | 0.13 | 0.13 | 0.13 |
| Haze | % | 0.5 | 0.8 | 0.9 | 0.9 | 1.0 |
| Total light transmittance | % | 88 | 88 | 88 | 88 | 90 |
| Pencil hardness | — | 2B | 2H | 2H | H | F |
| Whitening during molding | Injection speed: 200 mm/sec | No | No | No | No | Yes |
| | Injection speed: 300 mm/sec | No | No | No | No | Yes |
| Charpy impact strength | kJ/m² | 67 | 3 | 3 | 3 | 3 |
| MVR | cm³/10 min | 14 | 15 | 15 | 15 | 43 |

As is clear from Tables 1 and 2, the molded articles obtained in the working examples exhibited excellent surface hardness, fluidity and resistance to whitening during molding, exhibited excellent transparency due to having low haze values and exhibiting high total light transmittance, and also exhibited good impact resistance.

Therefore, it can be understood that the purpose of the present invention, that is, to provide a polycarbonate resin composition which exhibits high surface hardness and excellent abrasion resistance and transparency, hardly suffers from the problem of whitening during molding and exhibits excellent thin wall moldability, has been achieved for the first time by satisfying all the requirements of the present invention.

INDUSTRIAL APPLICABILITY

The polycarbonate resin composition of the present invention exhibits excellent mechanical characteristics, exhibits high surface hardness an excellent abrasion resistance and transparency, hardly suffers from the problem of whitening during molding and exhibits excellent thin wall moldability, and can therefore be advantageously used in a wide variety of fields, such as vehicles, electrical/electronic equipment and homes, and is extremely useful in industrial terms.

The invention claimed is:

1. A polycarbonate resin composition, comprising, relative to 100 parts by mass of (A) a polycarbonate resin comprising a polycarbonate resin having a structural unit of formula (1),
    3-200 parts by mass of (B) a (meth)acrylate copolymer comprising (b1) aromatic (meth)acrylate units and (b2) methyl methacrylate units at a (b1)/(b2) mass ratio of 5-80/95-20

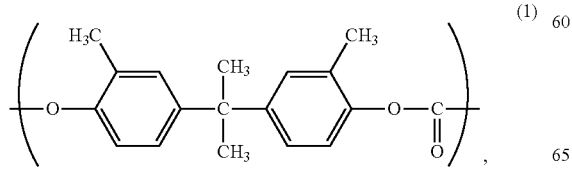
(1)

wherein a mass average molecular weight of the (meth)acrylate copolymer (B) is from 5,000-30,000.

2. The polycarbonate resin composition according to claim 1, wherein a content of the (meth)acrylate copolymer (B) is from 15-45 parts by mass relative to 100 parts by mass of the polycarbonate resin (A).

3. The polycarbonate resin composition according to claim 1, wherein a proportion of the polycarbonate resin having a structural unit of formula (1) is 80 mass % or more of the polycarbonate resin (A).

4. The polycarbonate resin composition according to claim 1, wherein the polycarbonate resin (A) comprises 60-90 mass % of the polycarbonate resin having a structural unit of formula (1) and 40-10 mass % of a polycarbonate resin having a structural unit of formula (2):

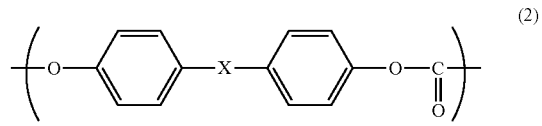
(2)

wherein, in formula (2), X denotes any of

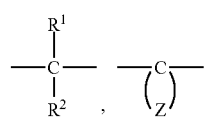

R¹ and R² are each independently a hydrogen atom or a methyl group, and Z is a group that bonds to a carbon atom (C) to form an optionally substituted alicyclic hydrocarbon having 6-12 carbon atoms.

5. The polycarbonate resin composition according to claim 4, wherein X is an isopropylidene group.

6. The polycarbonate resin composition according to claim 4, wherein a viscosity average molecular weight of the polycarbonate resin having a structural unit of formula (1) is from 15,000-35,000, and a viscosity average molecular weight of the polycarbonate resin having a structural unit of formula (2) is from 10,000-28,000.

7. A molded article obtained by injection molding the polycarbonate resin composition according to claim 1.

8. The molded article according to claim 7, wherein the molded article is injection molded at a cylinder temperature of 260-340° C. and an injection speed of 100-5,000 mm/sec.

9. The molded article according to claim 7, wherein the molded article has a thickness of 2 mm or less.

10. The molded article according to claim 7, wherein the molded article is at least one selected from the group consisting of an interior panel for a vehicle, a lamp lens for a vehicle, a window, a housing, a game machine component, a touch panel and a light guide.

11. A sheet or film obtained by extrusion molding the polycarbonate resin composition according to claim 1.

12. A protective window comprising the sheet according to claim 11, wherein the protective window is suitable for a portable display unit, a component for a display device, a cover for a display device, a component for a protective device, or a vehicle part.

* * * * *